United States Patent
Saers et al.

(10) Patent No.: US 10,177,557 B2
(45) Date of Patent: Jan. 8, 2019

(54) PASSIVE ELECTRONIC FUSE FOR PROTECTING A DC APPLICATION

(71) Applicant: ABB SCHWEIZ AG, Baden (CH)

(72) Inventors: Robert Saers, Västerås (SE); Lars Liljestrand, Västerås (SE); Tomas Tengner, Västerås (SE); Jesper Magnusson, Åkersberga (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/735,445

(22) PCT Filed: Jun. 12, 2015

(86) PCT No.: PCT/EP2015/063120
§ 371 (c)(1),
(2) Date: Dec. 11, 2017

(87) PCT Pub. No.: WO2016/198118
PCT Pub. Date: Dec. 15, 2016

(65) Prior Publication Data
US 2018/0183229 A1    Jun. 28, 2018

(51) Int. Cl.
*H02H 3/00* (2006.01)
*H02H 3/20* (2006.01)
(Continued)

(52) U.S. Cl.
CPC .............. *H02H 3/202* (2013.01); *B60L 3/04* (2013.01); *H02H 3/087* (2013.01); *H02H 3/445* (2013.01); *H02H 7/18* (2013.01); *H02H 3/021* (2013.01)

(58) Field of Classification Search
CPC .................................................... H02H 3/202
See application file for complete search history.

(56) References Cited

U.S. PATENT DOCUMENTS

| 4,686,618 A | * | 8/1987 | McMurray | ........... H02H 7/1225 361/100 |
| 5,892,644 A | | 4/1999 | Evans et al. | |

(Continued)

FOREIGN PATENT DOCUMENTS

| CN | 201956657 U | 8/2011 |
| CN | 102646968 B | 3/2015 |

(Continued)

OTHER PUBLICATIONS

International Search Report, issued in PCT/EP2015/063120, dated Feb. 12, 2016.

(Continued)

*Primary Examiner* — Stephen W Jackson
(74) *Attorney, Agent, or Firm* — Birch, Stewart, Kolasch & Birch, LLP

(57) ABSTRACT

A passive electronic fuse for protecting a DC application in the event of a fault includes a first leg including a first winding of a mutual inductor and a switch device connected in series, a second leg including a second winding of the mutual inductor. The first leg and the second leg are connected in parallel and a self-inductance of the second winding is lower than a self-inductance of the first winding. The second leg further includes a capacitor connected in series with the second winding of the mutual inductor, and the switch device is a thyristor or a switch device with switching properties of a thyristor.

20 Claims, 2 Drawing Sheets

(51) Int. Cl.
    *H02H 3/087*   (2006.01)
    *H02H 3/44*    (2006.01)
    *B60L 3/04*    (2006.01)
    *H02H 7/18*    (2006.01)
    *H02H 3/02*        (2006.01)

(56) References Cited

U.S. PATENT DOCUMENTS

| | | | |
|---|---|---|---|
| 6,862,162 B2 | 3/2005 | Casey | |
| 9,148,011 B2* | 9/2015 | Magnusson | H01H 9/542 |
| 2014/0177120 A1 | 6/2014 | Zhang et al. | |
| 2018/0137993 A1* | 5/2018 | Rong | H01H 9/54 |

FOREIGN PATENT DOCUMENTS

| | | | |
|---|---|---|---|
| JP | 2-133027 A | 5/1990 |
| WO | WO 2014/032692 A1 | 3/2014 |

OTHER PUBLICATIONS

Written Opinion of the International Searching Authority, issued in PCT/EP2015/063120, dated Feb. 12, 2016.

* cited by examiner

US 10,177,557 B2

PASSIVE ELECTRONIC FUSE FOR PROTECTING A DC APPLICATION

FIELD OF THE INVENTION

The present invention relates to a passive electronic fuse for protecting a DC application in the event of a fault. The electronic fuse is a passive circuit in that it relies on physical properties of the components of the circuit, and not on measurements and control means for protecting the DC application in the event of a fault. The DC application is for example DC breakers, electrical power system, such as charging units for a hybrid or pure electric vehicle, and electric energy storage systems, such as for data centers.

The electronic fuse comprises a first leg comprising a first winding of a mutual inductor and a switch device connected in series, and a second leg comprising a second winding of the mutual inductor. The first leg and the second leg are connected in parallel and a self-inductance of the second winding is lower than a self-inductance of the first winding.

The present invention also relates to an electrical power system for a hybrid or pure electric vehicle and an electric energy storage system for storing electrical energy that comprises the passive electronic fuse of the invention.

PRIOR ART

Traditionally conventional fuses have been used to protect devices from excessive currents in the event of a fault. These fuses are sacrificial devices comprising a metal wire that is configured to melt when it is subjected to a current corresponding to a fault.

A problem with the use of physical fuses is that the fuses must be manually replaced by an operator before the DC application can be operative after a fault. This can however be time consuming. Furthermore, replacing fuses adds cost to the DC application in form of personnel costs and loss of production due to unavailability of the system to which the DC application is used.

As a substitute to physical fuses, there are electronic fuses available. These fuses rely on means for measuring the current, logic means for determining if the measured current corresponds to the event of a fault, and control means for breaking the current to the DC application.

A problem with electronic fuses is that it takes relatively long time for the fuse to interrupt the current. This may result in that an operator is subjected to harmful electric shock or damage to the DC application. Furthermore, in the unlikely event of a malfunction of for example the means for measuring the current or the logic means, the fuse may be unable to interrupt the current.

WO2014032692 discloses an apparatus for handling current commutation of solid state and hybrid breakers. For this purpose, the apparatus comprises a commutation booster comprising two coupled inductors, where the first inductor is arranged in a first leg connected in series with a mechanical switch and the second inductor is arranged in the second leg connected in series with a semiconductor component.

US2014177120 discloses a system and a method for fault protection. The system comprises a control module, a switch and an inductive device. The control module is used for providing control signals and switching signals based on signals from a detecting device.

OBJECTS AND SUMMARY OF THE INVENTION

The object of the present invention is to provide an improved passive electronic fuse for a DC application. A first object of the invention is to provide a passive electronic fuse that interrupts the current based on physical properties of the components of the circuit in the event of a fault. A second object of the invention is to provide passive electronic fuse that can be reset in an easy manner. A third object of the invention is to provide passive electronic fuse that interrupts the current in a quick and reliable manner.

This object is obtained by a passive electronic fuse for a DC application as defined by claim 1. The passive electronic fuse is characterized in that the second leg further comprises a capacitor connected in series with the second winding of the mutual inductor, wherein the switch device is a thyristor or a switch device with switching properties of a thyristor.

The passive electronic fuse is activated on fast current rise (dI/dt), and not as traditional fuses on the absolute value of the current (|I|). This is obtained in that the first winding and the second winding of the mutual inductor is arranged so the second winding has a lower inductance than the first winding, together with the characteristics of the thyristor in the first leg and the capacitor in the second leg.

In the event of a fault, the current to the first and second leg increases rapidly. By means of the mutual coupling between the first and second winding, the mutual inductor will try to preserve the magnetic flux. Accordingly, at a fault the current will decrease in the first winding and the current in the second winding will increase. This trend will continue until the current in the first leg sinks to zero and becomes negative, resulting in that all current is directed to the second leg.

The thyristor is a bistable switch device that comprises the following characteristics. The thyristor will start to conduct current when its gate is triggered by a current pulse. After that the thyristor has been triggered, the thyristor will continue conducting as long as the current is positive, and return to blocking mode if the current direction is reversed.

Accordingly, in the event of a fault, the thyristor of the electronic fuse of the invention will stop conducting at the point in time when the current reaches zero.

Accordingly, after that the thyristor has stopped conducting all current is passing through the second leg. The capacitor in the second leg will during this process be charged. When the capacitor becomes fully charged, the capacitor will act as an isolator resulting in that no current will pass through the second leg. Accordingly, the current through both the first and the second leg will at this point be at zero.

The invention has the advantage that the current is interrupted based on the physical characteristics of the components of the passive electronic fuse. Accordingly, the passive electronic fuse is not dependent on current measurements, logical means for evaluating the measurements and control means for interrupting the current as in active electronic fuses. In particular, the passive electronic fuse of the invention has the advantage of providing a fast and reliable way of interrupting the current in the event of a fault.

According to an embodiment of the invention, the self-inductance of the second winding constitutes less than 30% of the self-inductance of the first winding, preferably less than 15% of the self-inductance of the first winding.

A relatively large difference between the self-inductance of the first and the second winding is advantageous in that the current in the first leg quickly sinks to zero. Accordingly, the electronic fuse is arranged so that the thyristor quickly interrupts the current through the first leg.

According to an embodiment of the invention, the electronic fuse comprises means for triggering a gate of the thyristor and the thyristor is a gate turn-on thyristor, wherein the means for triggering the gate of the thyristor is adapted to emit a pulse to the gate for triggering conduction of the thyristor.

After that the cause of the fault has been handled, the electronic fuse is reactivated by transmitting a current pulse to the gate of the thyristor. The electronic fuse will be operative same as before interrupting the current.

According to an embodiment of the invention, the electronic fuse comprises means for triggering a gate of the thyristor and the thyristor is at least one of a gate turn-off thyristor and a gate-commutated thyristor, wherein the means for triggering the gate of the thyristor is adapted to emit a pulse to the gate for turning off conduction of the thyristor.

The gate turn-off thyristor and a gate-commutated thyristor has the advantage that the conduction of the thyristor can manually be turned off by means of emitting the pulse to the gate.

According to an embodiment of the invention, the electronic fuse further comprises a third leg comprising an overvoltage protection circuit.

According to an embodiment of the invention, the third leg is connected in parallel to the first leg and the second leg.

According to an embodiment of the invention, the overvoltage protection circuit comprises a first snubber.

According to an embodiment of the invention, a second snubber is connected in parallel to the mutual inductor. The second snubber has the function to allow free-wheeling of the inductor during LC-oscillations when the electronic fuse interrupts the current by means that it consumes some of the inductive energy in the electronic fuse.

According to an embodiment of the invention, the electronic fuse further comprises a third snubber connected in parallel to the thyristor. The function of the third snubber is to protect the thyristor itself from current and voltage transients during the interruption of the current by the thyristor.

According to an embodiment of the invention, the electronic fuse further comprises a fourth snubber connected in parallel to the capacitor.

The fourth snubber has the function to limit the peak voltage across the capacitor and to enhance the current interruption or to enable a lower voltage rating of the capacitor. Alternatively, it would be possible to connect a bleeding resistor across the capacitor to discharge it to the system level after the current has been interrupted. This would require also a diode to prevent leakage current and the snubber would then form a resistor-diode snubber.

According to an embodiment of the invention, at least one of the first, second, third and fourth snubber is a varistor, a resistor capacitor snubber, a resistor capacitor diod snubber, or a capacitor.

According to an embodiment of the invention, the passive electronic fuse according to any of the previous claims, wherein the mutual inductor comprises an air core or a core of a magnetic material or a non-magnetic material.

According to an embodiment of the invention, the capacitor of the second leg is an electrolytic capacitor. The electrolytic capacitor has the advantage of high energy density. The drawback that it only can handle voltage in one direction is not a problem as the polarity of the system is well defined.

The object of the invention is further obtained by an electrical power system for a hybrid or pure electric vehicle according to claim 14. The system comprises a power delivery unit, a discharge circuit and a passive electronic fuse according to claims 1-13.

The power delivery unit of the hybrid or pure electric vehicles has for example a voltage between 400 V up to 1 kV and may therefor cause danger to humans at a fault.

For example, an accident of the vehicle may create a fault that drains the power delivery unit rapidly, which is dangerous to the passenger and people in the surrounding. Furthermore, a fault may also arise during service of the vehicle casing danger to a service technician.

The electrical power system comprising the passive electronic fuse improves the security of use of hybrid or pure electric vehicles in the event of a fault. In particular, the electronic fuse has the advantage to enable the current to be interrupted sufficiently quickly to avoid injuries to humans in the event of a fault.

According to an embodiment of the invention, the power delivery unit is an electrochemical battery, a super capacitor or a fuel cell stack.

The object of the invention is further obtained by an electric energy storage system for storing electrical energy according to claim 15. The system is comprised of series, and optionally parallel, connected electro-chemical battery cells, a power conversion device, and one or more passive electronic fuses according to any of claims 1-13.

The power conversion device is used for transmission and distribution of energy, such as renewable energy. The conversion device may process medium or high voltage, such as 30 kV. Accordingly, the event of a fault may cause danger to people in the vicinity of the conversion circuit.

The electric energy conversion circuit comprising the electronic fuse improves the security of use of electric energy storage systems in the event of a fault. In particular, the electronic fuse has the advantage to enable the current to be interrupted sufficiently quickly to avoid injuries to humans in the event of a fault.

According to an embodiment of the invention, the power conversion device is connected to an electrical AC grid and configured to provide active and optionally reactive power to said AC grid.

According to an embodiment of the invention, the power conversion system is connected to an electrical DC grid and is configured to provide active power to said DC grid.

According to an embodiment of the invention, the conversion system is connected to an AC load, DC load or multiples thereof. The conversion system may for example be used for data centers and uninterruptible power source (UPS).

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
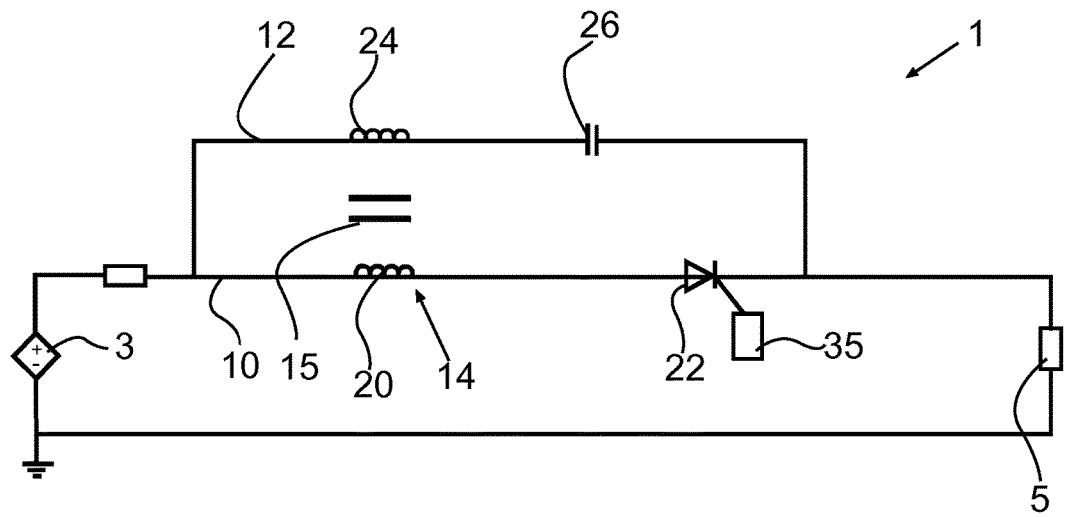
FIG. 1 shows an example of a passive electronic fuse according to a first embodiment of the invention.

FIG. 1 shows an example of a passive electronic fuse 1 according to a first embodiment of the invention. The electronic fuse 1 is adapted to be connected between the output of a DC energy source 3 and the load of a DC application 5. The DC energy source 3 may alternatively be a rectifier or similar non-constant DC source.

The electronic fuse 1 comprises a first leg 10 and a second leg 12 and a mutual inductor 14 between the first leg 10 and the second leg 12. The first leg 10 and the second leg 12 are connected in parallel.

The first leg 10 comprises a first winding 20 of the mutual inductor 14, and switch device in the form of a thyristor 22 or switch device with switching properties of a thyristor.

The second leg 12 comprises a second winding 24 of the mutual inductor 14, and a capacitor 26.

The mutual inductor 14 further comprises a core 15, such as an air core or a core of a magnetic material or a non-magnetic material.

The mutual inductor 14 is arranged so that a self-inductance of the second winding 24 is lower than a self-inductance of the first winding 20. The mutual inductor 14 has the intrinsic property to conserve the magnetic flux between the first winding 20 and the second winding 24. Thereby, at a rapid increase of the current, in order to conserve the magnetic flux, the current through the second winding 24 will increase while the current through the first winding 20 will decrease. This trend will continue until the current through the first winding 20 falls to zero and thereafter trying to form a reversed current through the first leg 10.

The thyristor 22 in the first leg 10 is configured to discontinue being conductive when receiving a reversed current. Accordingly, the reversed current will trigger the thyristor 22 to discontinue being conductive.

When the thyristor 22 has stopped being conductive, all current will pass through the second leg 12 and the capacitor 26 will be charged. When the capacitor 26 has been fully charged, the capacitor 26 will act as an isolator and no current can pass through the second leg 12. Accordingly, at this stage no current can pass through both the first leg 10 and the second leg 12. Hence, the electronic fuse 1 has disconnected the connection to the DC application 5.

Preferably, the self-inductance of the second winding 24 of the mutual inductance 14 constitutes less than 30% of the self-inductance of the first winding 20, more preferable less than 15% of the self-inductance of the first winding 20. A large difference between the self-inductance of the first winding 20 and the second winding 24 has the effect that it will take less time for the current in the first leg 10 to sink and accordingly less time before the thyristor 22 will stop being conductive. Accordingly, the electronic fuse 1 has the ability to quickly interrupt the current to the DC application 5.

The electronic fuse 1 further comprises means 35 for triggering a gate of the thyristor 22, which is adapted to emit a pulse to the gate of the thyistor 22.

According to one embodiment of the invention, the thyristor 22 is a gate turn-on thyristor, and the pulse that is emitted to the gate of the thyristor triggers the conduction of the thyristor 22. After that the electronic fuse 1 has interrupted the current, the electronic fuse 1 is restarted by emitting the pulse to the gate of the thyistor 22.

According to another embodiment of the invention, the thyristor 22 is one of a gate turn-off thyristor and a gate-commutated thyristor. The emitted pulse is triggering the thyristor 22 to discontinue being conductive. The gate turn-off thyristor and a gate-commutated thyristor provide the ability to manually interrupt the current to the DC application 5.

Figure 2:
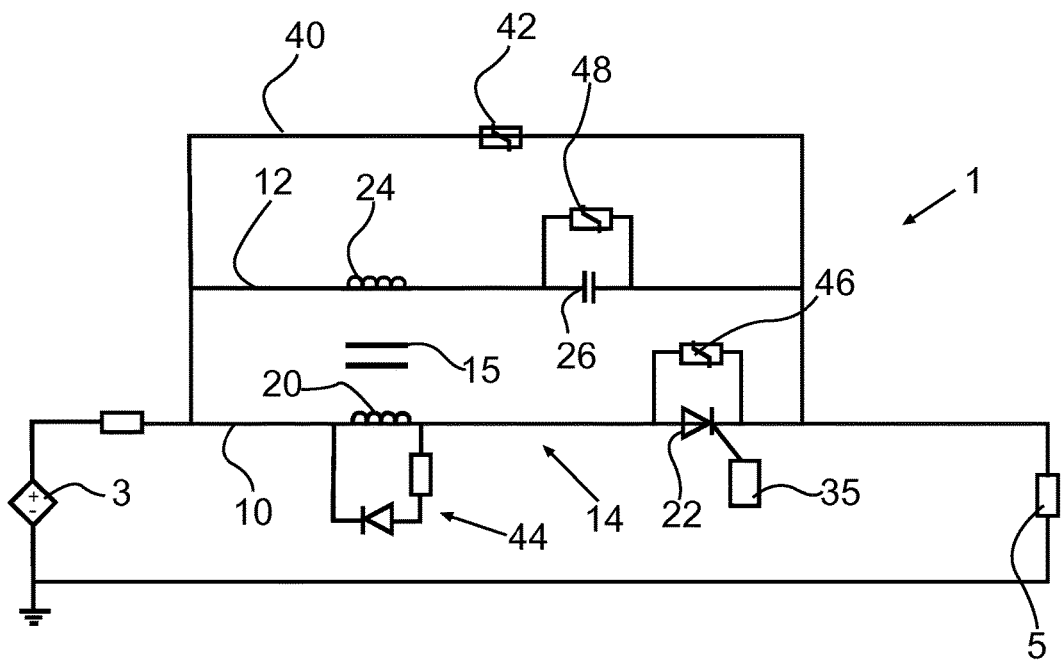
FIG. 2 shows an example of a passive electronic fuse according to a second embodiment of the invention.

FIG. 2 shows an example of a passive electronic fuse 1 according to a second embodiment of the invention.

The electronic fuse 1 differs from the first embodiment in that the electronic fuse 1 comprises a third leg 40 comprising an overvoltage protection circuit. The third leg 40 is connected in parallel to the first leg 10 and the second leg 12. The overvoltage protection circuit 40 comprises a first snubber 42.

The electronic fuse 1 further differs from the first embodiment in that the electronic fuse 1 comprises a second snubber 44, a third snubber 46, and a fourth snubber 48.

The second snubber 44 is connected in parallel to the first winding 20 of mutual inductor 14. The third snubber 46 is connected in parallel to the thyristor 22 of the first leg 10. The fourth snubber 48 is connected in parallel to the capacitor 26 of the second leg 12.

Any of the first snubber 42, the second snubber 44, the third snubber 46 and the fourth snubber 48 may be a varistor, a resistor capacitor snubber, a resistor capacitor diod snubber, or a capacitor. In FIG. 2 the first snubber 42, the third snubber 46 and the fourth snubber 48 are varistors, and the second snubber 44 is a resistor capacitor diod snubber.

Figure 3:
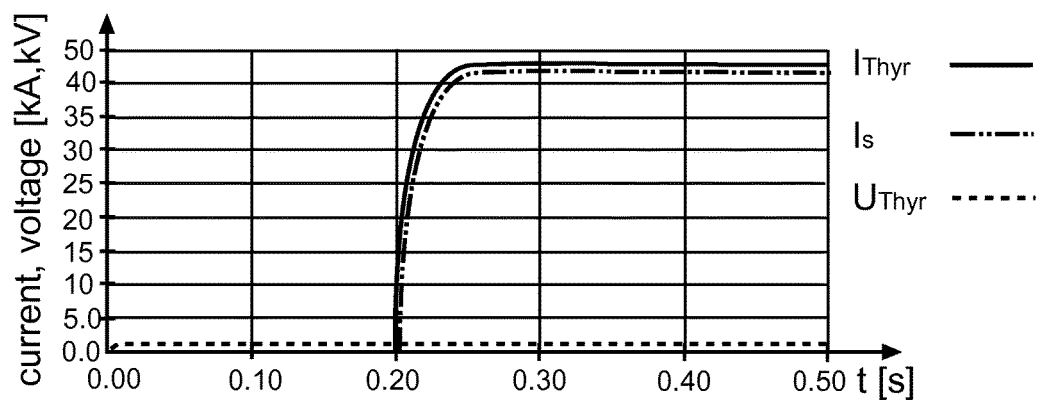
FIG. 3 shows an example of current and voltage in the event of a fault when the passive electronic fuse of the invention is lacking.

FIG. 3 shows an example of the current and voltage in a DC system without a passive electronic fuse 1. The system voltage is 900 V and the nominal current is 300 A. As a fault is applied at t=0.2 s, the current starts to increase rapidly and cannot be limited. The current of the first leg ($I_{Thyr}$) and the second leg ($I_s$) quickly reaches a steady state level above 40 kA.

Figure 4:
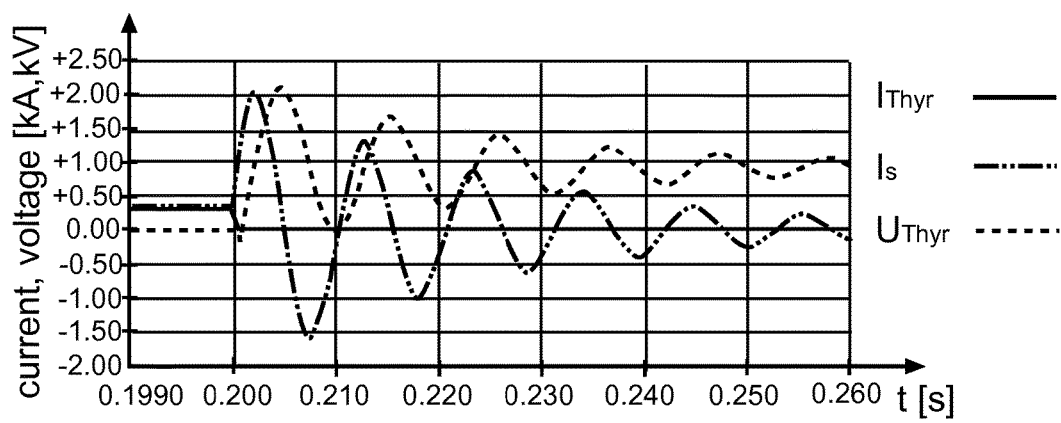
FIG. 4 shows an example of current and voltage in the event of a fault when the passive electronic fuse of the invention is installed.

FIG. 4 shows the same system as in FIG. 3, where the system has been equipped with the passive electronic fuse 1. When the fault is applied at t=0.2 s, the system current rushes into the second winding 24 due to its lower self-inductance. This increased current $I_s$ in the second winding produces an increase in magnetic flux also in the first winding 20. Hence, the current in the first winding $I_{Thyr}$ will decrease to prevent the increase of magnetic flux. As the current $I_{Thyr}$ in the first winding 20 reaches zero, the thyristor 22 returns to blocking mode. The full current is now conducted by the second winding 24 and the voltage across the capacitor 26 increases. Some oscillations occur between the system inductance and the capacitor 26 but the current $I_s$ never exceeds 2 kA. The current settles at zero and the thyristor voltage $U_{Thyr}$ becomes equal to the system voltage. The electronic fuse 1 now prevents any current flow by blocking the system voltage by both the thyristor 22 and the capacitor 26.

The present invention is not limited to the disclosed embodiments but may be modified within the framework of the claims.

The invention claimed is:

1. A passive electronic fuse for protecting a DC application in the event of a fault, the electronic fuse comprising:
    a first leg comprising a first winding of a mutual inductor and a switch device connected in series; and
    a second leg comprising a second winding of the mutual inductor,
    wherein the first leg and the second leg are connected in parallel and a self-inductance of the second winding is lower than a self-inductance of the first winding,
    wherein the second leg further comprises a capacitor connected in series with the second winding of the mutual inductor, and
    wherein the switch device is a thyristor or a switch device with switching properties of a thyristor.

2. The passive electronic fuse according to claim 1, wherein the self-inductance of the second winding constitutes less than 30% of the self-inductance of the first winding.

3. The passive electronic fuse according to claim 1, wherein the electronic fuse comprises means for triggering a gate of the thyristor, and the thyristor is a gate turn-on thyristor, wherein the means for triggering the gate of the thyristor is adapted to emit a pulse to the gate for triggering conduction of the thyristor.

4. The passive electronic fuse according to claim 1, wherein the electronic fuse comprises means for triggering a gate of the thyristor, and the thyristor is at least one of a gate turn-off thyristor and a gate-commutated thyristor wherein the means for triggering the gate of the thyristor is adapted to emit a pulse to the gate for turning off conduction of the thyristor.

5. The passive electronic fuse according to claim 1, wherein the electronic fuse further comprises a third leg comprising an overvoltage protection circuit.

6. The passive electronic fuse according to claim 5, wherein the third leg is connected in parallel to the first leg and the second leg.

7. The passive electronic fuse according to claim 5, wherein the overvoltage protection circuit comprises a first snubber.

8. The passive electronic fuse according to claim 1, wherein a second snubber is connected in parallel to the first winding of the mutual inductor.

9. The passive electronic fuse according to claim 1, wherein the electronic fuse further comprises a third snubber connected in parallel to the first winding of the thyristor.

10. The passive electronic fuse according to claim 1, wherein the electronic fuse further comprises a fourth snubber connected in parallel to the capacitor.

11. The passive electronic fuse according to claim 7, wherein at least one of the first snubber, the second snubber, the third snubber and the fourth snubber is a varistor, a resistor capacitor snubber, a resistor capacitor diod snubber, a resistor diode snubber, or a capacitor.

12. The passive electronic fuse according to claim 1, wherein the capacitor of the second leg is an electrolytic capacitor.

13. The passive electronic fuse according to claim 1, wherein the mutual inductor comprises an air core or a core of a magnetic material or a non-magnetic material.

14. An electrical power system for a hybrid or pure electric vehicle, comprising:
a power delivery unit;
a discharge circuit; and
the passive electronic fuse according to claim 1.

15. An electric energy storage system for storing electrical energy, comprising:
series, and optionally parallel, connected electro-chemical battery cells;
a power conversion device; and
one or more of the passive electronic fuses according to claim 1.

16. The passive electronic fuse according to claim 1, wherein the self-inductance of the second winding constitutes less than 15% of the self-inductance of the first winding.

17. The passive electronic fuse according to claim 2, wherein the electronic fuse comprises means for triggering a gate of the thyristor, and the thyristor is a gate turn-on thyristor, wherein the means for triggering the gate of the thyristor is adapted to emit a pulse to the gate for triggering conduction of the thyristor.

18. The passive electronic fuse according to claim 2, wherein the electronic fuse comprises means for triggering a gate of the thyristor, and the thyristor is at least one of a gate turn-off thyristor and a gate-commutated thyristor wherein the means for triggering the gate of the thyristor is adapted to emit a pulse to the gate for turning off conduction of the thyristor.

19. The passive electronic fuse according to claim 3, wherein the electronic fuse comprises means for triggering a gate of the thyristor, and the thyristor is at least one of a gate turn-off thyristor and a gate-commutated thyristor wherein the means for triggering the gate of the thyristor is adapted to emit a pulse to the gate for turning off conduction of the thyristor.

20. The passive electronic fuse according to claim 2, wherein the electronic fuse further comprises a third leg comprising an overvoltage protection circuit.

* * * * *